(No Model.)
T. G. & J. H. OTTERSON.
CAP OR COVER FOR JARS OR CANS.
No. 308,571. Patented Nov. 25, 1884.
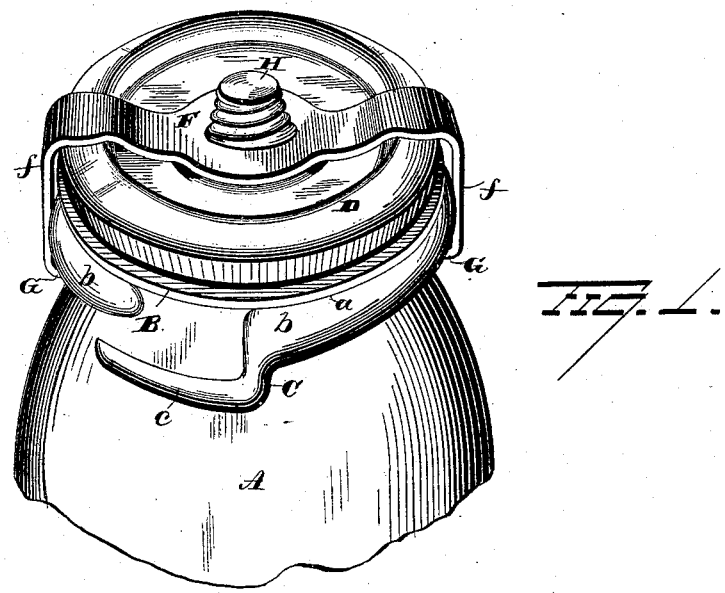
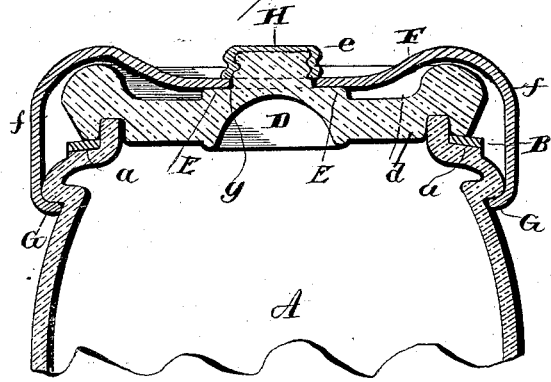
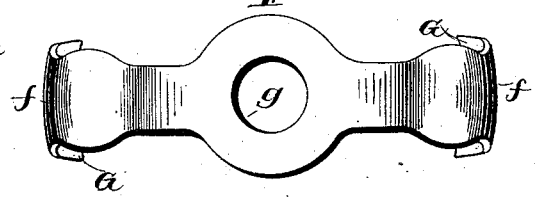
WITNESSES
Geo. F. Downing.
S. G. Nottingham
INVENTOR
T. G. Otterson,
J. H. Otterson,
B. H. A. Symons ATTORNEY

UNITED STATES PATENT OFFICE.

THOMAS G. OTTERSON, OF PHILADELPHIA, PENNSYLVANIA, AND JOHN H. OTTERSON, OF NEW YORK, N. Y.

CAP OR COVER FOR JARS OR CANS.

SPECIFICATION forming part of Letters Patent No. 308,571, dated November 25, 1884.

Application filed June 12, 1884. (No model.)

*To all whom it may concern:*

Be it known that we, THOMAS G. OTTERSON, of Philadelphia, in the county of Philadelphia and State of Pennsylvania, and JOHN H. OTTERSON, of New York, in the county of New York and State of New York, have invented certain new and useful Improvements in Caps or Covers for Jars or Cans; and we do hereby declare the following to be a full, clear, and exact description of the invention, such as will enable others skilled in the art to which it appertains to make and use the same.

Our invention relates to an improvement in caps or covers for jars or cans, the object of the same being to provide a lid with a clamp journaled thereto, whereby the clamp can be turned without moving the lid. A further object is to provide a lid which shall have a rotary clamp secured thereto, while the top of the lid remains free from a projection above its general surface. A further object is to provide a lid having a clamp secured thereto in such a manner that it may be quickly and easily detached therefrom. A further object is to provide a clamping-lid which cannot fail to form a perfect joint, which can be adjusted and removed with ease and quickly, without the use of a lever, and which is durable and inexpensive.

With these ends in view our invention consists in certain features of construction and combinations of parts, as will be hereinafter described, and pointed out in the claims.

In the accompanying drawings, Figure 1 is a view of the jar with lid clamped thereon. Fig. 2 is a vertical section, and Fig. 3 is a detached view of the clamp.

Our invention relates more particularly to cans or jars constructed of glass or earthen ware, but may be applied to jars constructed of other material as well.

A represents a glass jar provided with the usual shoulder, $a$, adapted to receive an elastic gasket, B.

Immediately beneath the shoulder $a$ the jar is provided with two inclines, $b$, molded integral with the jar. The lower edges of the inclines $b$ are flat and extend at right angles to the neck of the jar, thus forming a secure hold for the clamp. The inclines $b$ commence and end at points on the neck of the jar diametrically opposite. The lower ends of the inclines are provided with stops C, and short beads $c$, extending from the stops beneath the upper ends of the inclines, form guides for the ends of the clamp when the same is placed in position, and also serve as strengthening-ribs for the neck of the jar. The lid D is provided with a depressed central portion, $d$, which fits within the upper lip of the jar, while the outer rim of the lid rests on the gasket. At the center of the depressed portion $d$ a slight upwardly-extending boss E is formed, and at the center of the boss E a stud, $e$, is formed. The lower portion of the stud $e$ is smooth and the upper portion threaded, or provided with an incline, the upper end of the stud being on a level with or below the upper surface of the clamp.

The clamp F consists of a single piece of metal having the two opposite depending arms $f$, the ends of the arms $f$ being provided with the inwardly-extending lips G, constructed to take under the edge of the inclines $b$. The edges of the lips G are made concave to conform to the curve of the jar, and the central portion of the clamp is provided with a perforation, $g$, adapted to receive the stud $e$ and allow the clamp to loosely embrace the smooth portion of the same. The clamp is constructed of such shape that it conforms to the general contour of the upper surface of the lid and the inclines on the neck of the jar, but does not rest in contact with the lid, excepting at the central portion, which bears on the upper surface of the boss E, and the clamp is widened to give greater strength at such points as are subject to the greater strain. The clamp is secured to the lid by means of a metal cap, H, which is threaded or grooved internally to conform to the thread or incline on the stud $e$. A washer may be inserted between the cap H and the clamp, but our experience has not as yet found it desirable.

To adjust the lid, it is placed on the jar with the ends of the clamp above the guide or strengthening beads $c$. The clamp is now rotated by the hand, the lips G taking under the edges of the inclines $b$ and drawing the lid snugly down on the gasket. As the clamp has no bearing on the lid excepting at the center, it may be turned with very little strength and will have no tendency, or so little that it amounts to nothing in practice, to cause the lid to turn with it, and, as the bearing-surface of the boss E corresponds to the shape of the mouth of the jar, the lid will be drawn evenly on the gasket, and any tendency to break by unequal strain is thereby avoided.

The clamp is made of material as thin as is consistent with the required strength, and is preferably constructed to lie as near the upper surface of the lid as it can without touching it, and may, by turning it sufficiently far, be brought down in contact with the cover; but this is not necessary to form a perfect joint.

From the foregoing it will be seen that by depressing the central portion of the lid the stud e is protected from injury, and when the jars are packed, one on top of another, the studs do not come in contact with the bottom of the jar next above, but permit the latter to rest solidly on the lid. Again, by depressing the center and curving the clamp to correspond with such depression, we are enabled to make the clamp sufficiently large to withstand the wear and pressure thereon and still have it sufficiently pliable to give or bend freely while securing the lid in position.

It is evident that many slight changes may be made in the form and construction of the several parts above described without departing from the spirit and scope of our invention. For example, the clamp might have three or more branches adapted to take under the inclines, instead of two, the number of inclines being increased to correspond. Hence we do not wish to limit ourselves strictly to the construction herein set forth; but, Having fully described our invention, what we claim as new, and desire to secure by Letters Patent, is—

1. The combination, with a jar having inclines on its neck, and a lid provided with a centrally-located threaded stud formed integral therewith, of a clamp pivotally secured on said stud and adapted to take under the inclines, and a nut for holding the clamp in position, substantially as set forth.

2. As a new article of manufacture, a cover for jars or cans, consisting of a disk having a depressed central portion provided with a boss and threaded stud at its center, a clamp pivoted on the stud and bearing on the boss, and a cap adapted to engage the threaded portion of the stud and secure the clamp thereon, substantially as set forth.

3. The combination, with a jar having inclines formed on its neck, and strengthening-beads or guides, and stops formed at the ends of the inclines, of a lid, and a clamp pivotally secured to the lid, the clamp being constructed to engage the said inclines, guides, and stops, substantially as and for the purpose set forth.

4. The combination, with a jar, of a lid having a screw-threaded stud located at its center and formed integral therewith, a clamp pivoted on the stud, and a nut or cap for locking the clamp on the stud, substantially as set forth.

5. The combination, with a jar, of a lid having a depressed central portion, a boss located at the center of the depressed portion, a stud located at the center of the boss and provided with a smooth lower portion and a threaded upper portion, a clamp adapted to rotate on the smooth portion of the stud and lock the lid to the jar, and a nut for holding the clamp in position, substantially as set forth.

6. The combination, with a jaw having inclines formed on neck, and a lid provided with a central screw-threaded stud, of a clamp pivotally secured on the stud by a nut and adapted to take under the inclines, the clamp having no bearing on the lid excepting at the central portion around the stud, substantially as set forth.

7. The combination, with a jar having an incline on its neck, of a lid having a depressed central portion, a stud formed integral with said lid at the center of said depressed portion, the upper end of said stud being on a line with or slightly below the upper surface of the clamp, and a clamp pivoted on the stud and adapted to engage the incline on the jar, substantially as set forth.

In testimony whereof we have signed this specification in the presence of two subscribing witnesses.

THOMAS G. OTTERSON.
JOHN H. OTTERSON.

Witnesses:
MAX PETZOLD,
ALFRED E. HORN.